United States Patent Office 3,520,344
Patented July 14, 1970

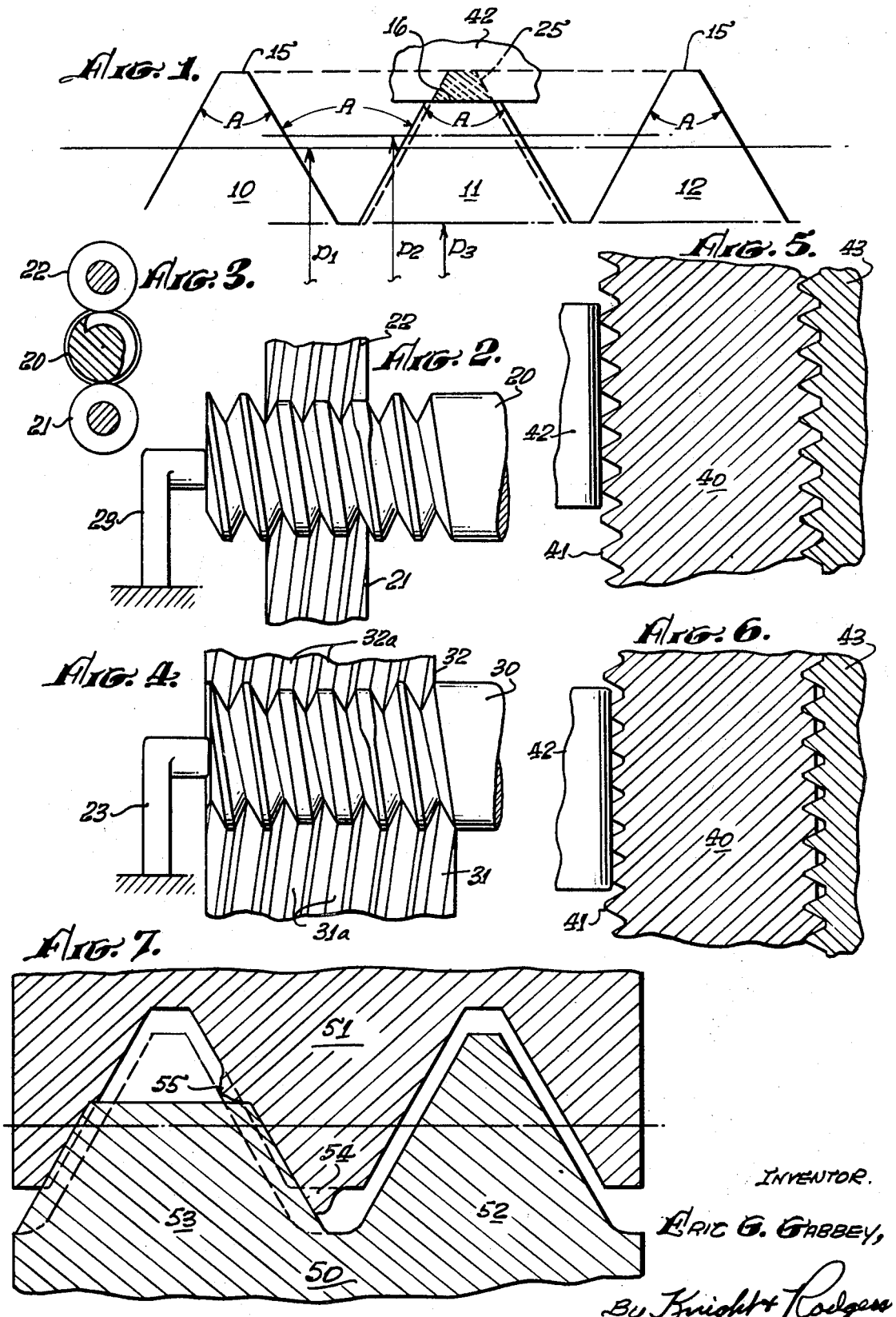

3,520,344
SELF-LOCKING SCREW THREAD
Eric G. Gabbey, Box 43271, Los Angeles, Calif. 90043
Continuation of application Ser. No. 481,635, Aug. 23, 1965. This application July 17, 1968, Ser. No. 781,290
Int. Cl. B21h 3/04; F16b 39/30
U.S. Cl. 151—22    9 Claims

ABSTRACT OF THE DISCLOSURE

A self-locking screw thread arrangement that includes a device having an external helical thread, the major diameter of which, inwardly of one end, being compressed inwardly to increase the axial thickness of the thread, the compressed thread being provided with flat flanks of the same slope as the remainder of the thread.

This application is a continuation of Ser. No. 481,635, filed Aug. 23, 1965, now abandoned.

The present invention relates generally to a process for forming helical screw threads on articles such as nuts, bolts, and other types of metal fasteners; and is particularly concerned with producing a novel type of self-locking thread and a fastener provided with such a thread. It has been discovered that under continued vibration, such as is encountered in airplanes, plain nuts and bolts become loosened by vibration. If the initial tension under which they are placed when the nuts and bolts are tightened is released, the nut rapidly becomes unscrewed as a result of the vibration. One means previously employed to resist this loosening under vibration is provision of a lock washer of some type which is designed to retard the unscrewing motion of the nut and bolt and also to maintain the two of them under some degree of tension. However, this arrangement has proved unsatisfactory in many circumstances, for various reasons.

In order to meet this problem of resisting vibration, it has also become common to add a friction device to the nut or bolt. A device of this character generally takes the form of an insert in the bolt or an elastic ring on the nut, such elements generally being made of non-metallic material, such as the spnthetic resins or plastics. One limitation on the use of friction devices of this character is that the non-metallic materials generally do not withstand high temperatures and consequently soften and fail at elevated temperatures.

An ideal fastener having helical screw threads on it and designed to resist vibration should have several characteristics to the maximum possible extent. For example, the fastener should resist vibration over a wide range of axial travel of the parts so that it does not tend to loosen with extreme rapidity, should it back off from a fully tightened position under the influence of vibration. It should also be re-usable so that the same fastener can be removed and replaced a number of times without the necessity of using new fasteners each time and without any material sacrifice in holding power.

Among other desirable characteristics in the ideal fastener, it should be adapted to any manufacturer's product, thereby making it widely available for use. A fastener, such as a nut or a bolt or the combination of the two, should not require the addition of a third component which may become lost or require replacement. A further requirement of an ideal fastener is that it should be comparatively inexpensive to manufacture.

It is also highly desirable that a vibration-resistant fastener of this type be made entirely of metal, so that full advantage can be taken of modern high tensile strength alloys and that the fastener can resist relatively high temperatures, for example, in the vicinity of 1000° F. or higher, without any decrease in holding power or any loss in strength. These temperatures are now being encountered in actual practice in airplanes and missiles which fly at speeds greater than sonic speed so that severe vibration is encountered along with relatively high temperatures.

Thus, it becomes a general object of the present invention to devise a vibration-resistant fastener having all of the above advantages in the maximum possible degree and also devise a simple and inexpensive process of manufacturing such a fastener.

It is a more specific object of the present invention to provide a vibration-resistant fastener of this character which comprises an all-metal structure adapted to operate successfully under comparatively high ambient temperatures.

It is also an object of the present invention to develop a process for forming a helical screw thread on a bolt or other metal fastener which has the characteristics of resisting vibration and being re-usable.

The objects of the present invention are achieved by forming on a metal fastener, or a portion thereof, a self-locking helical thread by a process that includes forming selected intermediate turns of the thread to a greater pitch diameter than the adjoining threads while maintaining a substantially uniform slope to the flanks of the thread. The pitch or lead and thread angle are maintained constant throughout the length of the thread while metal displaced inwardly from the truncated tips of the thread is distributed substantially uniformly over the flanks of the threads.

This process produces a helical thread, on a bolt or a nut in which the pitch diameter for a portion of the thread has been increased to provide a tighter fit with the mating thread which is a standard shape. This tighter fit between the truncated thread and the mating thread is maintained as long as there is engagement between the truncated and mating threads. For easy starting, the truncated portion is preferably spaced from both ends of the complete thread by at least one full turn and preferably two turns.

The term "thread" is commonly used to refer either to the entire helix or to a single turn. It is used in both meanings herein, but it is believed that the proper meaning will be clear from the context.

How the above objects and advantages of the present invention, as well as others not specifically mentioned herein are attained, will be more readily understood by reference to the following description and to the annexed drawing, in which:

FIG. 1 is a diagram of the profile of a V-shaped thread illustrating the change in outline caused by truncating one thread.

FIG. 2 is a diagrammatic illustration of a bolt being rolled between a pair of thread forming rolls to form truncated threads.

FIG. 3 is a diagram of the bolt and rolls of FIG. 2, at reduced scale showing the elements in cross section.

FIG. 4 is a view similar to FIG. 3 but showing thread-forming rolls for forming a complete thread with a truncated portion.

FIGS. 5 and 6 are diagrams illustrating a variational form of pressure roll and thread-forming die cooperating with each other to form truncated threads.

FIG. 7 is a diagram at greatly enlarged scale showing the fit between a nut having threads formed according to the present process mating with standard threads on a nut.

Referring now to the drawing, and more particularly to FIG. 1, there is shown an enlarged profile of three consecutive threads indicated at 10, 11 and 12. The profile shown is a standard V-shaped thread which is illustrative of the present invention but not limitative necessarily since other threads can also be shaped or modified in the manner hereafter described.

For purposes of comparison, the threads 10 and 12 are full threads having the normal or standard shape. These threads have an angle between their flanks as indicated at A which is 60° for U.S. standard thread, but any other angle according to accepted standards may be employed. These threads have a pitch diameter $D_1$ as indicated, this diameter being the diameter at which the axial thickness of the thread is equal to the axial spacing between successive threads. In other words, the axial thickness of a thread at the diameter $D_1$ is equal to one-half the pitch, the pitch being defined as the center-to-center distance between the threads or the reciprocal of the number of threads per inch.

According to the present invention, selected threads are modified by truncating the threads as indicated at the thread 11. The purpose of this is to increase the thickness or axial dimension of the thread and thereby increase the pitch diameter of the reformed thread to a value as indicated at D. The result is to decrease the clearance between the thread on the bolt and the mating thread on a nut, the latter retaining its standard profile.

The standard threads have a small flat surface at the apex or crest of the threads as indicated at 15. For purposes of the present description, a truncated thread may be considered to be one which has a wider flat surface, as at 16, created by reducing the maximum radius of the thread at the crest with respect to the full or standard thread.

According to the present invention, it is preferred first to make a standard or normal thread for the full threaded length of a fastener, for example a bolt or machine screw. This thread may be formed in any suitable manner, as by rolling, which is a common manner of forming threads. After the full thread is completed, a portion of the thread is then re-formed, as by re-rolling, to truncate a selected number of threads, that is, a selected number of turns of the complete threaded portion of the screw. This operation is shown diagrammatically in FIG. 2 in which the screw 20 is being re-rolled by a pair of rolling dies 21 and 22, axial movement of the threaded screw being prevented by abutting stationary stop 23. Rolling dies 21 and 22 are so shaped that, as they press against the thread on screw 20, the crest of a selected number of turns of the thread is flattened, thus reducing the diameter of the crest from the full diameter indicated at 15 in FIG. 1 to a lesser diameter indicated at 16 in FIG. 1.

The displaced metal indicated at 25 in FIG. 1 at the crest of the thread may be considered then as being displaced inwardly of the thread and the effect of it is to thicken the axial dimension of the thread, as shown at 11. By working the sides or flanks of the threads at the same time that the truncating takes place, the result is that the thread flanks remain flat and retain the same slope as the slope of the standard thread and the thread angle at A remains constant. The effect of re-forming the threads is to thicken or expand individual turns, thus increase the pitch diameter from the value $D_1$ to the value $D_2$, since the point at which the axial thickness of the thread is equal to half the pitch has now been moved outwardly with respect to its original position.

At the same time, the lead or pitch of the threads has been maintained constant. It will also be seen that the cross sectional area of the thread outwardly of the root diameter $D_3$ remains substantially constant since the same amount of metal is present in the re-formed thread as was present originally, the change being a change in the profile of the thread.

The process as described above in the preferred form contemplates production of the self-locking thread in two steps which are carried out separately. This is particularly applicable to the situation where at one time or place the screw is formed with a normal thread and at a subsequent time or place that same screw is then re-formed or reshaped in a separate operation to give to it the self-locking feature. However, when it is known in advance that the complete self-locking thread is to be produced, it is within the scope of the present invention to produce the complete thread in a single operation.

FIG. 4 illustrates how this can be done when the machine screw 30 has the threads on it rolled by dies 31 and 32. The dies are provided with sections at 31a and 32a which produce the truncated threads of greater pitch diameter at the same time that the remaining turns of the complete thread are formed, these portions 31a and 32a of the dies having the same configuration as the dies 21 and 22 of FIG. 2. The same operation can be performed by grinding the threads, if desired.

It will be realized that while the operation is here shown as being carried out with only two dies rolling against the screw, the process may be carried out with three rotating dies, or with flat dies, all of which arrangements are well known in the art and need no particular description here.

FIGS. 5 and 6 indicate a modified arrangement of dies which is particularly applicable to re-shaping a portion consisting of two or more complete turns of the thread after the initial thread has been rolled to a standard size and shape. In this arrangement, the machine screw 40 provided with threads 41 is being reshaped by means of a pressure roll 42 which presses against the threads at one side of the screw to form the truncated portion. As roll 41 moves radially inward from the position of FIG. 5 to that of FIG. 6, it displaces the metal of the truncated portion inwardly. At the side of the screw opposite roll 42 is a rotating die 43 which is suitably shaped to work particularly along the flanks of the threads in order to reshape the flanks to keep the original thread angle A but to thicken the individual threads in order to increase their pitch diameter. Thus, the arrangement here produces the same self-locking thread on the screw as previously indicated.

FIG. 7 is a diagram showing greatly enlarged a thread on screw 50, which may be produced by an previously described process, in engagement with mating threads on nut 51. Nut 51 may be asumed to have a mating thread of standard shape while the screw has some truncated threads as the result of forming it with the self-locking thread described above. The thread at 52 is normal in size and shape while the thread at 53 has had its profile altered as described, to raise the pitch diameter.

If the pitch diameter is increased sufficiently, the width of the screw thread then becomes greater at a given radius than the width of the space between threads on the nut and the interference between the two may cause a slight elastic displacement of metal from the nut. Any excess metal can flow down into the space provided at the root of the screw threads, or into the space above the truncated screw threads, as indicated at 54 and 55 respectively. The latter space is particularly large since the crest of the screw threads has been relatively depressed, as shown.

In many situations it will be sufficient to truncate or increase the pitch diameter of only two or three threads or turns, in which case the truncated threads are spaced from both ends of the threaded portion of the screw. For greater resistance to vibration a length of threads at least equal to the length of the mating nut may be truncated; or even all threads beyond one or two normal threads for starting engagement with a nut or the like.

From this discussion, it will be apparent that the re-formed, self-locking threads on the screw mate adequately with the standard threads on the nut without damaging the latter, since the thread pitch, the thread angle, and the lead angle of the threads are all constant. The pitch diameter of the screw threads may be altered as much as desired, as by varying the distance between the dies, and if the interference fit is sufficiently tight that the metal of the thread on the nut is worked or displaced, this is no obstacle to engagement of the two sets of mating threads since there is adequate space at the roots of the threads for the metal to flow into. Were there no such space for the metal to flow into, the interference fit could produce galling and, if carried to an extreme, could prevent the screw from turning with respect to the nut.

The invention as so far described has been assumed to be formed on an external thread, such as a machine screw; but the invention may be equally well applied to a nut or other article having an internal thread. The same considerations hold true in both internal and external threads since the pitch diameter of the threads is increased in both instances.

It has been found in actual practice that a screw having a thread of the character described can be reused a number of times, in fact a sufficient number of times to meet requirements of military specifications, without losing its holding power or without the necessity of reworking the threads. Furthermore, the self-locking thread described is effective without the addition of any lock washer or other member and provides a locking arrangement which is made entirely of metal. If the friction between the bolt and the surrounding threads becomes sufficiently great, a dry lubricant of suitable nature may be used to reduce friction.

Since various changes may be made in the details of the above-disclosed invention, without departing from the spirit and scope thereof, the foregoing is considered to be illustrative of, rather than limitative upon, the invention defined by the appended claims.

I claim:

1. The method of forming a locking thread comprising the steps of forming an uninterrupted external helical thread on an elongated member having a distal end, contouring a first portion of said thread adjacent said distal end to a predetermined major diameter and axial thickness, contouring substantially flat flanks on said first portion, contouring a second portion of said thread inwardly of said first portion to a compressed major diameter less than said predetermined major diameter and to an increased axial thickness greater then said predetermined axial thickness, and further contouring substantially flat flanks on said second portion of said thread, while providing said second portion of said thread with substantially the same cross-sectional area as that of said first portion of said thread.

2. The method of providing a locking thread comprising the steps of forming a continuous external helical thread on an elongated cylindrical member having a distal end, so that thread is provided with substantially flat flanks, a predetermined major diameter and a predetermined axial thickness, compressing a selected portion of said thread inwardly of said distal end of said member so as to reduce the major diameter thereof below said predetermined major diameter and to expand said selected portion of said thread axially so as to increase the axial thickness of said selection portion of said thread beyond said predetermined thickness.

and forming the flanks of said selected potrion of said thread to a substntially flat contour without removing material therefrom, while providing said selected portion of said thread with substantially the same cross-sectional area as that of the remainder of the thread.

3. The method as recited in claim 2 in which said helical thread is formed by rolling.

4. The method as recited in claim 2 in which said helical thread is formed to provide a predetermined slope for said flanks thereof, and in which when said flanks of said selected portion of said thread are given said substantially flat contour they are also formed to said predetermined slope.

5. The method of providing a locking thread comprising the steps of rolling an external helical thread on an elongated cylindrical member having a distal end,
so that said thread is provided with substantially flat flanks, a predetermined major diameter and a predetermined axial thickness, and simultaneously rolling between dies a selected portion of said thread inwardly of said distal end of said member so as to compress said selected portion and reduce the major diameter thereof below said predetermined major diameter and to expand said selected portion of said thread axially so as to increase the axial thickness of said selected portion of said thread beyond said predetermined thickness, and so as to form the flanks of said selected portion of said thread to a substantially flat contour.

6. The method of providing a locking thread comprising the steps of rolling an external helical thread on an elongated cylindrical member having a distal end,
so that said thread is provided with substantially flat flanks, a predetermined major diameter and a predetermined axial thickness, and then rolling a selected portion of said thread inwardly of said distal end of said member so as to compress said selected portion and reduce the major diameter thereof below said predetermined major diameter and to expand said selected portion of said thread axially so as to increase the axial thickness of said selected portion of said thread beyond said predetermined thickness, and so as to form the flanks of said selected portion of said thread to a substantially flat contour.

7. The method as recited in claim 6 in which for said rolling said selected portion of said thread is engaged by a member along the crest thereof for compressing said selected portion of said thread, and then said compressed selected portion of said thread is engaged by a member contoured to flatten the flanks thereof to provide said flanks thereof with said substantially flat contour.

8. The method as recited in claim 6 in which for said rolling said selected portion of said thread is engaged by dies that simultaneously compress said selected portion of said helical thread and form the flanks thereof to said substantially flat contour.

9. In combination with an internally threaded element having substantially V-shaped threads with smooth flat flanks of a predetermined slope, a device for making a locked connection with said element comprising an elongated cylindrical body,
said body having a continuous uninterrupted thread thereon,
said thread on said body including a first portion adjacent one end thereof contoured to mesh with said thread of said element, and a second portion inwardly of said one end,
said second portion having smooth flat flanks of substantially the same slope as that of said slope of said thread of said internally threaded element and that of said first portion,
said second portion being truncated relative to said first portion and said thread of said internally threaded element so that the major diameter of said second portion is less than that of said first portion and the pitch diameter of said second portion is greater than that of said first portion, each convolution of said second portion being axially wider than each convolution of said first portion and said thread of said internally threaded element for providing an interference fit with said thread of said internally threaded element, said second portion having substantially the same cross-sectional area as that of said first portion.

References Cited

UNITED STATES PATENTS

| 2,371,365 | 3/1945 | Tomalis et al. | 151—22 X |
| 3,233,258 | 2/1966 | Neuschotz | 10—10 |

RAMON S. BRITTS, Primary Examiner

U.S. Cl. X.R.

10—10